Dec. 7, 1965   A. M. SEVERDIA   3,222,053
TOOLMAKER'S CLAMP
Filed Aug. 16, 1963   2 Sheets-Sheet 1
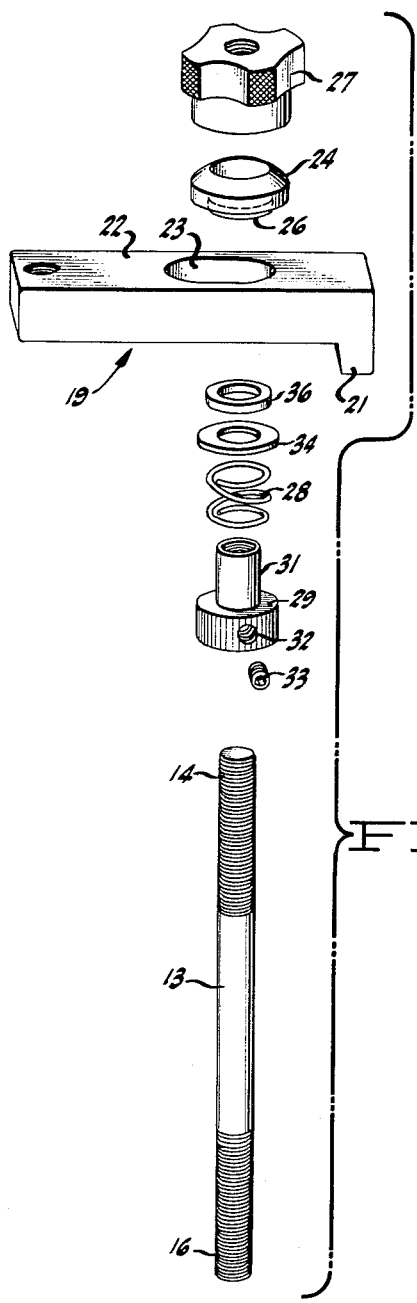
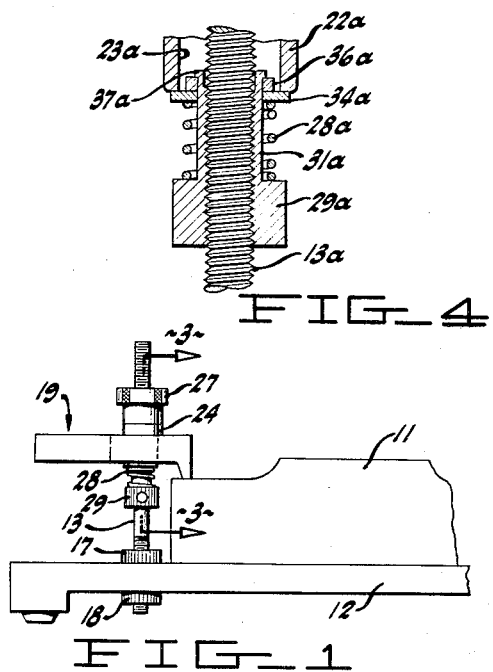
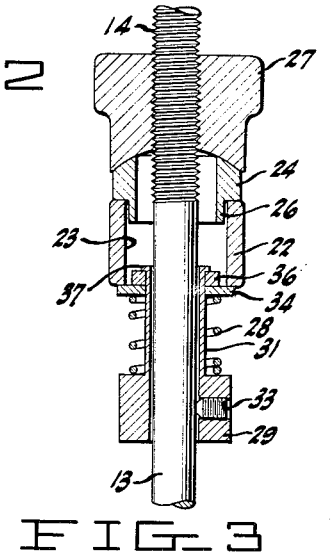
INVENTOR.
ANTON M. SEVERDIA
BY Julian Caplan
ATTORNEY Dec. 7, 1965     A. M. SEVERDIA     3,222,053
TOOLMAKER'S CLAMP
Filed Aug. 16, 1963     2 Sheets-Sheet 2
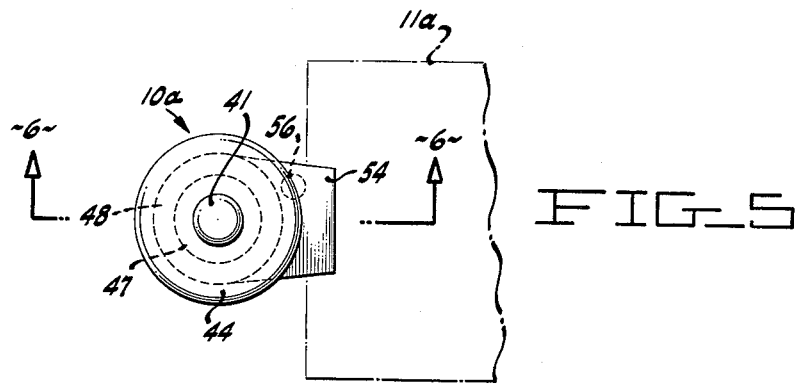
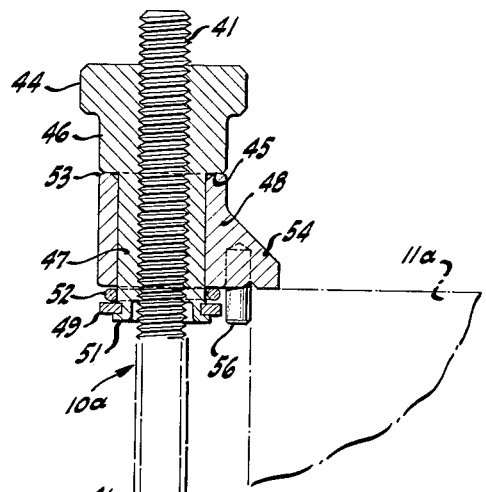
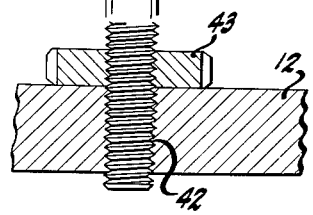
INVENTOR.
ANTON M. SEVERDIA
BY Julian Caplan
ATTORNEY United States Patent Office 3,222,053
Patented Dec. 7, 1965

3,222,053
TOOLMAKER'S CLAMP
Anton M. Severdia, Portola Valley, Calif. (% Severdia Manufacturing Co., 1590 Laurel St., San Carlos, Calif.)
Filed Aug. 16, 1963, Ser. No. 302,572
3 Claims. (Cl. 269—91)

This invention relates to a new and improved clamp of the type used by toolmakers, machinists, and the like to attach a workpiece to a jig, the bed of a machine or other work support, or for similar purposes.

A principal feature and advantage of the present invention is the provision of a clamp which may be applied to the workpiece rapidly in that the amount of adjustment required of the machinist is reduced over conventional clamps of this general character.

There is provided a spring which applies pressure to a clamp bar biasing the clamp bar away from the workpiece so that the clamp bar does not fall to the support while the clamping pressure on the workpiece is being adjusted. Heretofore springs for a similar purpose have been used, but it has been necessary to select springs of proper height for the dimensions of the workpiece and the selection of springs of the proper height has been time-consuming and frequently required cutting of a section of spring from a length of spring stock. In accordance with the present invention a spring of uniform, preformed length is used. Instead of the bottom end of said spring abutting the jig or worktable, a vertically adjustable lower abutment is fastened to the rod used as an integral part of the clamp.

A further feature and advantage of the invention is the fact that a uniform pressure is applied to the underside of the clamp bar regardless of the dimensions of the workpiece.

In a modified clamp, provision is made for engaging and disengaging the clamp bar from the workpiece simply by turning the thumbscrew or nut which applies clamping pressure. In this form of the invention the clamp bar is normally rotatable relative to the thumbscrew which applies downward pressure thereon. However, the clamp bar is formed with a pin or other stop which prevents turning of the clamp bar relative to the nut when said pin is in contact with the workpiece. Restraining turning the clamp bar results in applying vertically downward pressure into clamping engagement with the workpiece. Accordingly, by simple rotation of the thumbscrew the clamp may be brought to bear against the workpiece and the pressure of the clamp thereon may likewise be adjusted.

Other objects of the present invention will become apparent upon reading the following specification and referring to the accompanying drawings in which similar characters of reference represent corresponding parts in each of the several views.

In the drawings:

FIG. 1 is a schematic side-elevational view showing the clamp in engagement with a workpiece.

FIG. 2 is an enlarged exploded prospective view of the parts of the clamp.

FIG. 3 is a fragmentary vertical sectional view taken substantially along the line 3—3 of FIG. 1.

FIG. 4 is a plan view of a modification.

FIG. 5 is a view similar to FIG. 1 of a modified clamp construction.

FIG. 6 is a sectional view taken substantially along the line 6—6 of FIG. 5.

In the form of the invention shown in FIGS. 1 to 3 inclusive, the clamp, which is the subject of the invention, is shown attaching a workpiece 11 to a jig or support 12 which also may be the bed of a milling machine, drill press, or the like. The clamp is formed with a rod 13 which, in the form of the invention shown in FIGS. 1 to 3, is provided with threads 14 and 16 at top and bottom, respectively. The bottom threaded portion 16 extends through a suitable hole in jig 12 with nuts 17, 18 tightened against opposite faces of member 12 to hold the rod in position. It will be understood, that as an alternate the hole in table 12 may be threaded to receive the threaded ends 16 and a lock nut or the like applied. The shape of the clamp member 19 used in conjunction with the present invention is subject to wide variation. In that form shown in the accompanying drawings, member 19 has a hook portion 21 at one end which is brought to bear against the workpiece 11 to clamp it against base 12. Approximately at right angles to hook 21 is an elongated shank 22 formed with an elongated hole 23 through which rod 13 extends. A rotatable pressure washer 24 having a small diameter shank 26 fits inside slot 23, the large diameter portion 24 bearing against the margins of member 19. Nut 27 is threaded upon the threads 14 of rod 13 and applies pressure against pressure washer 24 and hence against clamp member 19 and applies downward force to hook 21 against workpiece 11.

It is customary in the toolmaking art to interpose between base 12 and the underside of clamp portion 19 a spring which exerts a uniform upward pressure against the downward pressure of thumbscrew 27 and hence facilitates location and tightening of the clamp and prevents clamp bar 19 from falling out of position during minor adjustments. It will be understood that the distance between table 12 and clamp bar 19 varies depending upon the dimensions of workpiece 11. Heretofore, it has been necessary to select from a stock of springs a spring of proper height for such dimension or as an alternative to cut from a long stock of spring a piece of the proper dimensions.

The present invention simplifies the selection of the necessary spring. Thus, there is provided a suitable uniform length of spring 28 of helical spring stock which is sufficiently long so that it exerts an upward pressure of the desired force. An abutment 29 is secured to rod 13 to provide a stop for the lower end of spring 28. In the form of the invention herein shown abutment 29 has a shank 31 which fits interiorly of spring 28. The bottom of member 29 is formed with a threaded hole 32 to receive set screw 33. By tightening screw 33 the abutment 29 may be located along the length of the unthreaded portion of rod 13 at such location as to provide the necessary upward pressure against the underside of clamp bar 19. To facilitate installation of the structure, a washer 34 is installed on the upper end of spring 28 of a diameter greater than the width of slot 23 and above washer 34 is a small diameter washer 36 which fits inside slot 23. Washer 36 is secured to the abutment 29 by means of staking of the upper end of the shank 31 as indicated by reference numeral 37.

In the form of the invention shown in FIG. 4, rod 13a is threaded throughout its entire length. The abutment 29a is similarly threaded and in this form of the invention the set screw 33 may be eliminated. Corresponding parts are designated by the same reference numeral followed by subscript a.

In use in this form of the invention, rod 13 is secured to bed 12 adjacent workpiece 11 and when thus secured is clamped in place by tightening screws 17 and 18. Clamp nut 27 is turned until the underside of clamp 21 is approximately at the proper height to make contact with workpiece 11. Abutment 29 is raised or lowered until it is in approximately the proper position to bring the washer 34 to bear against the underside of clamp 19 at the proper height, whereupon screw 33 is tightened securing the abutment 29 in place. It will be understood that in the form of the invention shown in FIG. 4 the latter operation is completed by turning abutment 29 along rod 13 to the proper location. The clamp bar 19 is moved inwardly and outwardly to the desired position with reference to workpiece 11, this operation being made possible by reason of elongated slot 23. When the hook 21 is in the proper location, nut 27 is turned down bringing the hook 21 to bear against the workpiece 11 and clamping the same in position. When minor adjustments are necessary, such as lateral movement of workpiece 11, nut 27 may be loosened but clamp 19 is not displaced because abutment 29 holds spring 28 in position and upward pressure is applied to clamp 19 as required.

In the form of the invention shown in FIGS. 5 to 6, inclusive, workpiece 11a is held in contact with jig 12 or the bed of a machine as in the preceding modification. The clamp 10a which is the subject of the invention is provided with a stem 41 preferably threaded throughout its entire length. The bottom of stem 41 extends through a hole 42 in table 12 and is secured in place by jam nut 43.

Threaded onto the upper end of rod 41 is a thumbscrew or nut 44 having a downwardly projecting shank 46. Below shank 46 is an extension 47. Clamp arm 48 is rotatable about the outside of shank extension 47 and engages shoulder 45 on the underside of shank portion 46. A washer 49 is carried on the bottom of shank extension 47 and is staked as indicated by reference numeral 51. Spring 52 is interposed between washer 49 and member 48 applies upward pressure to cause the top of portion 48 to frictionally engage shoulder 45. For such purpose, the upper edge of portion 48 may be pointed as indicated by reference numeral 53.

Extending laterally to one side is a hook 54 integral with portion 48 and extending over the workpiece 11a. A pin 56 is recessed into the underside of hook 54 and engages the side edge of workpiece 11a.

In use, thumbscrew 44 is turned to bring the clamp 10a upward and downward on rod 41 to the approximate proper location. Member 48 moves with nut 44 and is held in contact therewith by means of spring 52. Because of the friction between point 53 and the underside of shank 46, normally member 48 turns with nut 44. However, as the clamp approaches the elevation of workpiece 11a, turning movement of hook 54 is impeded by reason of pin 56 coming in contact with the side of the workpiece 11a, thereby stopping rotation of member 48 relative to nut 44. Accordingly, once the hook 54 is in contact with the workpiece 11a it remains stationary, or in other words the member 48 does not turn when nut 44 is turned. Downward pressure is applied by nut 44 against clamp hook 54 and the workpiece 11a is clamped against table 12.

When it is necessary to release workpiece 11a, a turning movement of nut 44 through a slight angle is sufficient to bring pin 56 out of contact with the workpiece 11a and to release the pressure of hook 54 thereagainst. As soon as this slight turning movement has been completed, the workpiece 11a may be removed.

What is claimed is:

1. A machinist's clamp comprising a rod threaded at least on its upper end, means for securing an end of said rod to a supporting base, a clamp bar formed with an aperture for said rod and extending outward laterally of said rod for engagement with a workpiece on said support, a nut in threaded engagement with said rod positioned to apply pressure on the upper surface of said clamp bar having a downward extension through said aperture, a helical spring surrounding said rod and bearing against the bottom surface of said clamp bar, and abutment means on said extension below said spring restricting movement of said spring away from said clamp bar.

2. A machinist's clamp comprising a rod threaded at least on its upper end, means for securing the lower end of said rod to a supporting base, a clamp member formed with an enlarged aperture for said rod and extending laterally of said rod, stop means on said clamp member to restrain rotative movement of said clamp member relative to said rod upon contact with a workpiece while permitting movement of said clamp member in an axial direction relative to said rod to apply clamping pressure of the bottom surface of said clamp member on said workpiece, a nut threaded on the upper end of said rod and having a shoulder bearing against the top surface of said clamp member, said nut having an extension through said aperture and below said clamp member, an abutment on the lower end of said extension and a spring between said abutment and the bottom surface of said clamp member biasing said clamp member for rotative movement with said nut.

3. A clamp according to claim 2 in which said stop means comprises a projection on the bottom surface of said clamp means laterally offset from said rod.

References Cited by the Examiner
UNITED STATES PATENTS

| | | | |
|---|---|---|---|
| 1,676,289 | 7/1928 | Schmalz | 269—93 |
| 3,016,805 | 1/1962 | Kehde | 269—157 |
| 3,118,260 | 1/1964 | Bleicher | 269—94 |

ROBERT C. RIORDON, *Primary Examiner.*

FRANK SUSKO, *Examiner.*